(12) United States Patent
Fukasawa et al.

(10) Patent No.: US 12,473,479 B2
(45) Date of Patent: Nov. 18, 2025

(54) HEXAGONAL BORON NITRIDE POWDER AND METHOD FOR PRODUCING THE SAME, AND COMPOSITION AND HEAT DISSIPATION MATERIAL USING THE SAME

(71) Applicant: SHOWA DENKO K.K., Tokyo (JP)

(72) Inventors: Masaru Fukasawa, Shiojiri (JP); Yuki Otsuka, Kawasaki (JP)

(73) Assignee: Resonac Corporation, Tokyo (JP)

( * ) Notice: Subject to any disclaimer, the term of this patent is extended or adjusted under 35 U.S.C. 154(b) by 1574 days.

(21) Appl. No.: 16/648,343

(22) PCT Filed: Nov. 7, 2018

(86) PCT No.: PCT/JP2018/042045
§ 371 (c)(1),
(2) Date: Mar. 18, 2020

(87) PCT Pub. No.: WO2019/130869
PCT Pub. Date: Jul. 4, 2019

(65) Prior Publication Data
US 2020/0216738 A1     Jul. 9, 2020

(30) Foreign Application Priority Data

Dec. 27, 2017   (JP) ................. 2017-251279

(51) Int. Cl.
| | |
|---|---|
| C09K 5/14 | (2006.01) |
| C01B 21/064 | (2006.01) |
| C08J 5/18 | (2006.01) |
| C08K 3/04 | (2006.01) |
| C08K 3/38 | (2006.01) |
| C09C 1/00 | (2006.01) |

(52) U.S. Cl.
CPC ............ *C09K 5/14* (2013.01); *C01B 21/0648* (2013.01); *C08J 5/18* (2013.01); *C08K 3/04* (2013.01);
(Continued)

(58) Field of Classification Search
None
See application file for complete search history.

(56) References Cited

FOREIGN PATENT DOCUMENTS

| | | |
|---|---|---|
| CN | 103958400 A | 7/2014 |
| CN | 105026312 A | 11/2015 |
| (Continued) | | |

OTHER PUBLICATIONS

Fukasawa et al. (WO 2016/092951; translation provided by Google Patents Aug. 1, 2024.*

(Continued)

*Primary Examiner* — Guinever S Gregorio
(74) *Attorney, Agent, or Firm* — Sughrue Mion, PLLC

(57) ABSTRACT

A hexagonal BN powder containing an aggregate of primary particles of hexagonal BN nitride and having an average primary particle diameter, a 50% volume cumulative particle diameter $D_{50}$, a BET specific surface area, and a bulk density within predetermined ranges. Further, for a peak A in the particle diameter range of 1.0 μm or more and less than 20.0 μm and a peak B in the particle diameter range of 20.0 μm or more and less than 200.0 μm in a particle size distribution curve, the ratios of the height of the peaks are within predetermined ranges when the hexagonal BN powder is treated under predetermined conditions. Also disclosed is a method for producing the hexagonal BN powder, a composition including the hexagonal BN powder and at least one of a resin and a rubber, and a heat dissipation material containing the composition.

7 Claims, 3 Drawing Sheets

(52) U.S. Cl.
CPC .............. *C08K 3/38* (2013.01); *C09C 1/0081* (2013.01); *C01P 2002/60* (2013.01); *C01P 2002/76* (2013.01); *C01P 2004/50* (2013.01); *C01P 2004/53* (2013.01); *C01P 2004/54* (2013.01); *C01P 2004/61* (2013.01); *C01P 2006/11* (2013.01); *C01P 2006/12* (2013.01); *C01P 2006/40* (2013.01); *C08J 2363/02* (2013.01); *C08K 2003/385* (2013.01); *C08K 2201/001* (2013.01); *C08K 2201/005* (2013.01); *C08K 2201/006* (2013.01); *C08K 2201/014* (2013.01); *C08K 2201/017* (2013.01)

(56) References Cited

FOREIGN PATENT DOCUMENTS

| | | |
|---|---|---|
| CN | 106029561 A | 10/2016 |
| JP | 61-256905 A | 11/1986 |
| JP | 61-286207 A | 12/1986 |
| JP | 62-286207 A | 12/1986 |
| JP | 09-202663 A | 8/1997 |
| JP | 2011-098882 A | 5/2011 |
| TW | 201630806 A | 9/2016 |
| TW | 201634547 A | 10/2016 |
| WO | 2016/092734 A1 | 6/2016 |
| WO | 2016/092951 A1 | 6/2016 |
| WO | 2016/092952 A1 | 6/2016 |
| WO | 2017/038512 A1 | 3/2017 |
| WO | 2018/123788 A1 | 7/2018 |

OTHER PUBLICATIONS

Written Opinion for PCT/JP2018/042045, dated Feb. 11, 2019.
International Search Report for PCT/JP2018/042045, dated Feb. 11, 2019.
Wen Ying Zhou et al., "Thermal Conductive Composite BN/HDPE Plastics", Polymer Materials Science and Engineering, 2008, vol. 24, No. 2, pp. 83-86 (4 pages total).

* cited by examiner

HEXAGONAL BORON NITRIDE POWDER AND METHOD FOR PRODUCING THE SAME, AND COMPOSITION AND HEAT DISSIPATION MATERIAL USING THE SAME

CROSS REFERENCE TO RELATED APPLICATIONS

This application is a National Stage of International Application No. PCT/JP2018/042045 filed Nov. 7, 2018, claiming priority based on Japanese Patent Application No. 2017-251279 filed Dec. 27, 2017.

TECHNICAL FIELD

The present invention relates to a hexagonal boron nitride (hereinafter also referred to as "h-BN") powder comprising aggregates of primary particles of h-BN and a method for producing the same, and a composition and a heat dissipation material using the h-BN powder.

BACKGROUND ART h-BN particles have a layered structure similar to that of graphite and are excellent in characteristics such as thermal conductivity, electrical insulation properties, heat resistance, corrosion resistance, and lubricity-releasability. Therefore, h-BN particles are used as a filler of an insulating heat dissipation material of a resin, a rubber, or the like (hereinafter also simply referred to as a "resin or the like"), a solid lubricant, a solid release agent, a raw material for h-BN sintered body production, or the like.

In a case where h-BN particles are used as a filler of an insulating heat dissipation material of a resin or the like among these, for the purpose of the improvement of filling properties in the insulating heat dissipation material, and the inhibition of the anisotropy of characteristics due to orientation, for example, in Patent Literature 1, it is described that a h-BN powder of secondary particles that are aggregates of primary particles of h-BN, having a predetermined particle diameter and bulk density is used.

As the method for producing such a h-BN powder, conventional general methods can be used, and, for example, Patent Literatures 2 to 4 each describe a method of mixing a boron compound such as boric acid or borax and a nitrogen compound such as melamine or urea, calcining the mixture under an atmosphere of ammonia gas or a non-oxidizing gas, and then firing the calcined material at a high temperature of about 1400 to 2200° C. for crystal growth.

CITATION LIST

Patent Literature

PTL1: JP 2011-98882 A
PTL2: JP 61-286207 A
PTL3: JP 9-202663 A
PTL4: JP 61-256905 A

SUMMARY OF INVENTION

Technical Problem

However, in a case where the strength of the aggregates is insufficient, when the h-BN powder comprising such aggregates is mixed with a resin or the like, the aggregates collapse, and the filling rate in the resin or the like cannot be sufficiently improved. In addition, the tendency of the anisotropy of characteristics to increase due to orientation is seen, causing a decrease in the heat dissipation properties and insulation properties of the insulating heat dissipation material.

Therefore, from the viewpoint of the improvement of the filling properties of the h-BN powder in the resin or the like, the inhibition of the anisotropy of characteristics due to the orientation of the h-BN powder, and the like, the aggregates are required to have sufficient strength.

The present invention has been made in view of such circumstances, and it is an object of the present invention to provide a h-BN powder that can increase the thermal conductivity and withstand voltage (breakdown voltage) of a resin or the like when used as a filler of an insulating heat dissipation material of the resin or the like, and a method for producing the same. It is also an object of the present invention to provide a composition using the h-BN powder, and a heat dissipation material excellent in heat dissipation properties and insulation properties.

Solution to Problem

The present invention is based on the finding that when a h-BN powder comprising aggregates of primary particles of h-BN has a predetermined particle size distribution, and the aggregates have a predetermined aggregation strength, the heat dissipation properties and insulation properties of an insulating heat dissipation material of a resin or the like improve when the h-BN powder is used as the filler of the insulating heat dissipation material.

Specifically, the present invention provides the following [1] to [8]:

[1] A hexagonal boron nitride powder comprising an aggregate of primary particles of hexagonal boron nitride, having an average primary particle diameter of 0.5 μm or more and less than 10.0 μm, a 50% volume cumulative particle diameter $D_{50}$ of 10.0 to 150.0 μm, a BET specific surface area of 1.0 m$^2$/g or more and less than 10.0 m$^2$/g, and a bulk density of 0.50 to 2.00 g/cm$^3$, and having a peak A in a particle diameter range of 1.0 μm or more and less than 20.0 μm and a peak B in a particle diameter range of 20.0 μm or more and less than 200.0 μm in a particle size distribution curve representing volume-based frequency distribution, a ratio of a height a1 of the peak A to a height b1 of the peak B, a1/b1, before treatment being in a range of 0.07 to 0.80, and a ratio of a height a2 of the peak A to a height b2 of the peak B, a2/b2, after treatment being in a range of 0.40 to 2.00, when the hexagonal boron nitride powder is ultrasonically treated under the following condition 1 for 3 minutes,

[condition 1] 50 mL of an aqueous dispersion of 0.12% by mass of the hexagonal boron nitride powder at 20° C. is placed in a 50 mL glass beaker having a barrel inner diameter of 40 mm and a height of 60 mm, an end of a tip of a vibrator of an ultrasonic generator is set at a height of 1 cm from a bottom surface of a central portion of the beaker, and ultrasonic treatment is performed at an output of 150 W and an oscillation frequency of 19.5 kHz.

[2] The hexagonal boron nitride powder according to the above [1], having a maximum peak C within a particle diameter range of 45.0 to 150.0 μm in a particle size distribution curve representing volume-based frequency distribution of a powder obtained by classifying the hexagonal boron nitride powder within a particle diameter range of more than 45 μm and 106 μm or less using a vibrating sieve, a percent decrease in a height of the maximum peak C, (c1−c2)/c1×100, where c1 is a height of the maximum peak C before treatment and c2 is a height of the maximum peak C after treatment being 5% or more and less than 30% when the powder classified is ultrasonically treated under the condition 1 for 1 minute.

[3] A method for producing the hexagonal boron nitride powder according to the above [1] or [2], comprising steps of preparing a mixed powder comprising 50 to 90 parts by mass of a hexagonal boron nitride raw material powder and 10 to 50 parts by mass of one or two or more boron compounds selected from the group consisting of a boron oxoacid and boron oxide; adding and mixing with 100 parts by mass of the mixed powder 3.0 to 10.0 parts by mass, in terms of carbon atoms, of one or two or more carbon sources selected from the group consisting of graphite and a carbon-containing compound, to prepare a forming material; pressure-forming the forming material to make a formed body having a density of 1.40 to 1.70 g/cm$^3$; firing the formed body under a nitrogen gas atmosphere at 1000 to 2200° C. to obtain a fired material; and grinding the fired material and classifying a ground material, wherein the hexagonal boron nitride raw material powder has a ratio of an average primary particle diameter L to an average thickness d, L/d, in a range of 2.0 to 15.0, a 50% volume cumulative particle diameter $D_{50}$ of 0.20 to 5.00 μm, a BET specific surface area of 5.0 to 30.0 m$^2$/g, and a crystallite diameter of 150 to 400 Å.

[4] The method for producing the hexagonal boron nitride powder according to the above [3], wherein in the step of preparing a forming material, the carbon source is boron carbide, and 15 to 20 parts by mass of the boron carbide is added and mixed with 100 parts by mass of the mixed powder.

[5] The method for producing the hexagonal boron nitride powder according to the above [4], wherein the boron carbide is a powder having a 50% volume cumulative particle diameter $D_{50}$ of 0.1 to 15.0 μm.

[6] A composition comprising a base material comprising one or two or more selected from the group consisting of a resin and a rubber, and the hexagonal boron nitride powder according to the above [1] or [2].

[7] A heat dissipation material comprising the composition according to the above [6].

[8] The heat dissipation material according to the above [7], being a heat dissipation sheet.

Advantageous Effects of Invention

According to the present invention, it is possible to provide a h-BN powder that can increase the thermal conductivity and withstand voltage of a resin or the like when used as a filler of an insulating heat dissipation material of the resin or the like, and a method for producing the same.

Therefore, the composition of the present invention using the h-BN powder can provide a heat dissipation material excellent in heat dissipation properties and insulation properties.

DESCRIPTION OF EMBODIMENTS

A h-BN powder and a method for producing the same, and a composition and a heat dissipation material using the h-BN powder according to the present invention will be described in detail below.

[Hexagonal Boron Nitride (h-BN) Powder]

The h-BN powder of the present invention comprises aggregates of primary particles of h-BN. The h-BN powder has an average primary particle diameter of 0.5 μm or more and less than 10.0 μm, a 50% volume cumulative particle diameter $D_{50}$ of 10.0 to 150.0 μm, a BET specific surface area of 1.0 m$^2$/g or more and less than 10.0 m$^2$/g, and a bulk density of 0.50 to 2.00 g/cm$^3$.

The particle size distribution curve representing the volume-based frequency distribution of the h-BN powder has a peak A in the particle diameter range of 1.0 μm or more and less than 20.0 μm and a peak B in the particle diameter range of 20.0 μm or more and less than 200.0 μm. The h-BN powder of the present invention is characterized in that the ratio of the height a1 of the peak A to the height b1 of the peak B, a1/b1, before treatment is in the range of 0.07 to 0.80, and the ratio of the height a2 of the peak A to the height b2 of the peak B, a2/b2, after treatment is in the range of 0.40 to 2.00, when the h-BN powder is ultrasonically treated under the following condition 1 for 3 minutes.

[condition 1] 50 mL of an aqueous dispersion of 0.12% by mass of the hexagonal boron nitride powder at 20° C. is placed in a 50 mL glass beaker having a barrel inner diameter of 40 mm and a height of 60 mm, the end of the tip of the vibrator of an ultrasonic generator is set at a height of 1 cm from the bottom surface of the central portion of the beaker, and ultrasonic treatment is performed at an output of 150 W and an oscillation frequency of 19.5 kHz.

The h-BN powder meeting the above requirements has moderate particle size and aggregation strength, and thus when the h-BN powder is used as a filler of an insulating heat dissipation material of a resin or the like, the thermal conductivity and the withstand voltage can be effectively increased.

(Primary Particles)

The primary particles of the h-BN powder of the present invention has an average primary particle diameter of 0.5 μm or more and less than 10.0 μm, preferably 1.0 to 8.0 μm, and more preferably 2.0 to 4.0 μm. When the average primary particle diameter is 0.5 μm or more, aggregates of primary particles of h-BN having moderate aggregation strength in increasing the thermal conductivity and withstand voltage of a resin or the like can be formed. When the average primary particle diameter is less than 10.0 μm, the granular shape of such aggregates of primary particles is easily maintained and the filling rate in a resin or the like can be increased when the h-BN powder comprising the aggregates is added and mixed with the resin or the like.

Figure 1:
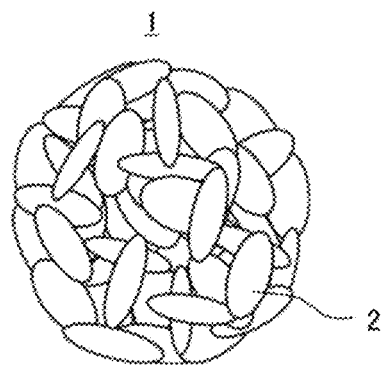
FIG. 1 is a schematic diagram of aggregates of primary particles of h-BN according to the present invention.

The aggregate of h-BN has a shape as schematically shown in FIG. 1 in an observation image by a scanning electron microscope (SEM). As shown in FIG. 1, in an aggregate of h-BN 1, primary particles of h-BN 2 aggregate to form a granular shape.

The average primary particle diameter referred to in the present invention is the number average value of the major axes of the primary particles and specifically a value obtained as the average value of the major axes of any 100 primary particles of h-BN measured in an observation image of the h-BN powder using an SEM.

(50% Volume Cumulative Particle Diameter $D_{50}$)

The h-BN powder has a $D_{50}$ of 10.0 to 150.0 μm, preferably 20.0 to 120.0 μm, and more preferably 30.0 to 100.0 μm. When $D_{50}$ is 10.0 μm or more, the aggregates can have sufficient aggregation strength. When $D_{50}$ is 150.0 μm or less, a sufficient filling rate to increase the thermal conductivity and withstand voltage of the resin or the like can be set.

$D_{50}$ referred to in the present invention is a value measured by a laser diffraction scattering method. Specifically, $D_{50}$ referred to in the present invention is a value measured using the Microtrac (registered trademark) particle size distribution measuring apparatus described in the following Examples.

(BET Specific Surface Area)

The h-BN powder has a BET specific surface area of 1.0 $m^2/g$ or more and less than 10.0 $m^2/g$, preferably 1.5 to 8.0 $m^2/g$, and more preferably 2.0 to 6.0 $m^2/g$. When the BET specific surface area is 1.0 $m^2/g$ or more, the compatibility with a resin or the like can be good when the h-BN powder is added and mixed with the resin or the like. When the BET specific surface area is less than 10.0 $m^2/g$, good dispersibility is obtained and the thermal conductivity and withstand voltage of a resin or the like can be sufficiently increased when the h-BN powder is added and mixed with the resin or the like.

The BET specific surface area referred to in the present invention is a value measured by a BET one-point method according to a flow method (adsorbate: nitrogen gas). Specifically, the BET specific surface area referred to in the present invention is a value measured using the fully automatic BET specific surface area measuring apparatus described in the following Examples.

(Bulk Density)

The h-BN powder has a bulk density of 0.50 to 2.00 $g/cm^3$, preferably 0.60 to 1.50 $g/cm^3$, and more preferably 0.70 to 1.00 $g/cm^3$. When the bulk density is 0.50 $g/cm^3$ or more, a sufficient filling rate to increase the thermal conductivity and withstand voltage of a resin or the like can be set when the h-BN powder is added and mixed with the resin or the like. When the bulk density is 2.00 $g/cm^3$ or less, the aggregation strength of the aggregates can be moderately maintained when the h-BN powder is added and mixed with a resin or the like.

The bulk density referred to in the present invention is the density (filling bulk density) calculated from the volume after 100 g of a powder sample is introduced into a 300 mL graduated cylinder and horizontally vibrated using an electric vibrating machine (number of vibrations 50 Hz, output 0.035 kW) for 3 minutes.

(Particle Size Distribution Curve)

Figure 2:
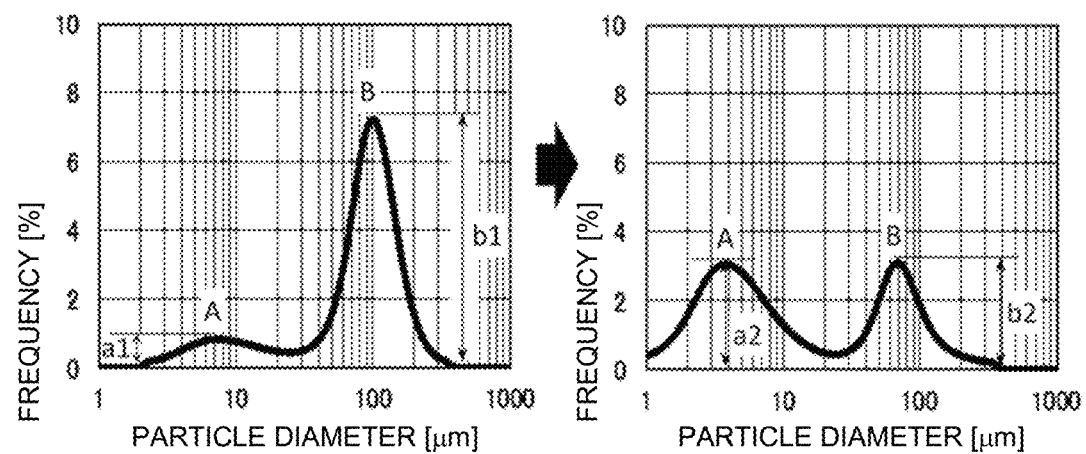
FIG. 2 shows particle size distribution curves when the h-BN powder of the present invention (Example 2) is ultrasonically treated for 3 minutes. The particle size distribution curve before the ultrasonic treatment is on the left side, and the particle size distribution curve after the ultrasonic treatment is on the right side.

FIG. 2 shows an example of particle size distribution curves representing volume-based frequency distribution before and after treatment when the h-BN powder of the present invention is ultrasonically treated for 3 minutes. The particle size distribution curves in FIG. 2 are shown for the h-BN powder of Example 2 described later.

The h-BN powder of the present invention has a peak A in the particle diameter range of 1.0 μm or more and less than 20.0 μm and a peak B in the particle diameter range of 20.0 μm or more and less than 200.0 μm in a particle size distribution curve representing volume-based frequency distribution, as shown in FIG. 2.

It is considered that for fine grains that are a powder (particles) having a particle diameter in the particle diameter range of 1.0 μm or more and less than 20.0 μm, including the peak A, and its vicinity in the particle size distribution curve, most primary particles of h-BN are present without forming aggregates. On the other hand, it is considered that coarse grains that are a powder in the particle diameter range of 20.0 μm or more and less than 200.0 μm, including the peak B, and its vicinity are aggregates of primary particles of h-BN.

The h-BN powder of the present invention has two such peaks in the particle size distribution curve, that is, comprises aggregates of primary particles of h-BN and primary particles in an unaggregated state.

The h-BN powder of the present invention is characterized in that the ratio of the height a1 of the peak A to the height b1 of the peak B, a1/b1, before treatment is in the range of 0.07 to 0.80, and the ratio of the height a2 of the peak A to the height b2 of the peak B, a2/b2, after treatment is in the range of 0.40 to 2.00, when the h-BN powder of the present invention is ultrasonically treated under the condition 1 for 3 minutes. In FIG. 2, the particle size distribution curve before ultrasonic treatment is shown on the left side of the arrow, and the particle size distribution curve after ultrasonic treatment is shown on the right side.

Figure 3:
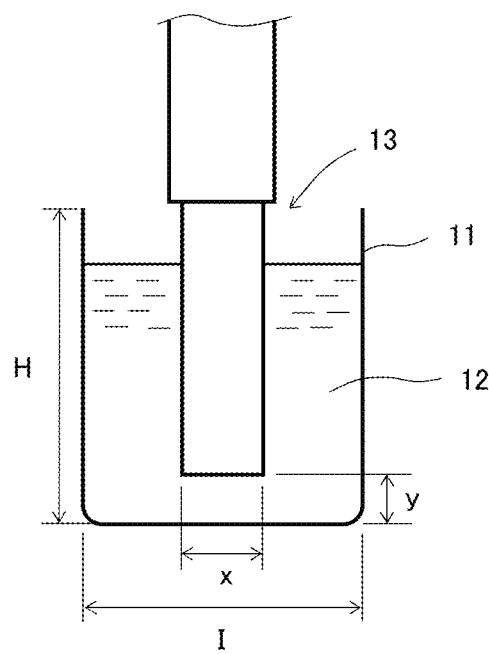
FIG. 3 is a schematic diagram for explaining condition 1 according to the present invention.

FIG. 3 shows the outline of the mode of the condition 1 in the ultrasonic treatment. The condition 1 are as follows: 50 mL of an aqueous dispersion 12 of 0.12% by mass of the h-BN powder at 20° C. is placed in a 50 mL glass beaker 11 having a barrel inner diameter (I) of 40 mm and a height (H) of 60 mm, the end of the tip 13 of the vibrator of an ultrasonic generator (not shown) is set at a height (y) of 1 cm from the bottom surface of the central portion of the beaker 11, and ultrasonic treatment is performed at an output of 150 W and an oscillation frequency of 19.5 kHz.

As the ultrasonic generator, specifically "Ultrasonic Homogenizer US-150T" manufactured by NIHONSEIKI KAISHA LTD. is used, and as the tip 13 of the vibrator, one in which the portion in contact with the aqueous dispersion 12 is made of stainless steel and has a cylindrical shape having a diameter (x) of 18 mm is used.

It can be said that a change in the shape of the particle size distribution curve before and after the ultrasonic treatment as described above indicates a change in the aggregation state of the aggregates of the h-BN powder. The change appears in the fact that the heights of the peaks A and B before treatment and after treatment show the predetermined ratios.

By ultrasonically treating the h-BN powder under the condition 1 for 3 minutes, aggregates of primary particles of h-BN having low aggregation strength among the aggregates of the primary particles of h-BN all collapse. Therefore, the change in the ratio of the heights of the peaks A and B in the particle size distribution curve corresponding to the change in the aggregation state before and after the ultrasonic treatment is an indicator of the aggregation strength of the aggregates. Particularly, when a2/b2 is as high as more than 2.00, the extent of the collapse of the aggregates due to the ultrasonic treatment is large, and it cannot be said that the aggregates have sufficient aggregation strength.

For the peak A before treatment and the peak A after treatment, the particle diameters at the peak positions are not necessarily the same. Usually, the peak position shifts to the smaller particle diameter side after treatment compared with before treatment. The same applies to the peak B.

a1/b1 is in the range of 0.07 to 0.80, preferably in the range of 0.08 to 0.50, and more preferably in the range of 0.09 to 0.20. Before the ultrasonic treatment, there are more coarse grains corresponding to the peak B than fine grains corresponding to the peak A. When a1/b1 is 0.07 or more, the withstand voltage of a resin or the like can be sufficiently increased when the h-BN powder is added and mixed with the resin or the like. When a1/b1 is 0.80 or less, the thermal conductivity of the resin or the like can be sufficiently increased.

a2/b2 is in the range of 0.40 to 2.00, preferably in the range of 0.50 to 1.90, and more preferably in the range of 0.60 to 1.50. When a2/b2 is 0.40 or more, the withstand voltage of a resin or the like can be sufficiently increased when the h-BN powder is added and mixed with the resin or the like. When a2/b2 is 2.00 or less, it can be said that the aggregates have sufficient aggregation strength to increase the thermal conductivity and withstand voltage of the resin or the like.

It is preferred that the h-BN powder has the maximum peak C within the particle diameter range of 45 to 150 μm in a particle size distribution curve representing volume-based frequency distribution for a powder classified within the particle diameter range of more than 45 μm and 106 μm or less using a vibrating sieve, and the percent decrease in the height of the maximum peak C, (c1−c2)/c1×100, where c1 is the height of the maximum peak C before treatment and c2 is the height of the maximum peak C after treatment is 5% or more and less than 30% when the powder classified is ultrasonically treated under the condition 1 for 1 minute.

Figure 4:
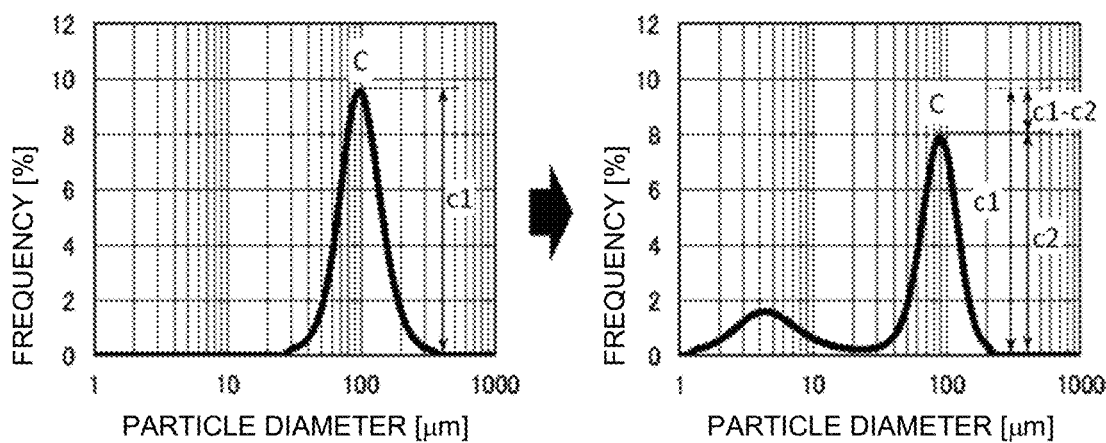
FIG. 4 shows particle size distribution curves when a predetermined classified powder of the h-BN powder of the present invention (Example 1) is ultrasonically treated for 1 minute. The particle size distribution curve before the ultrasonic treatment is on the left side, and the particle size distribution curve after the ultrasonic treatment is on the right side.

FIG. 4 shows an example of particle size distribution curves representing volume-based frequency distribution before and after treatment when a powder obtained by classifying the h-BN powder of the present invention within the particle diameter range of more than 45 μm and 106 μm or less using a vibrating sieve is ultrasonically treated for 1 minute. In FIG. 4, the particle size distribution curve before the ultrasonic treatment is shown on the left side of the arrow, and the particle size distribution curve after the ultrasonic treatment is shown on the right side. The particle size distribution curves in FIG. 4 are shown for a powder obtained by classifying the h-BN powder of Example 1 described later.

The particle size distribution curve referred to herein is measured for a powder obtained by classifying the h-BN powder within the particle diameter range of more than 45 μm and 106 μm or less using a vibrating sieve. The percent decrease in the height of the maximum peak C between particle size distribution curves before and after treatment when a powder classified in such a particular particle diameter range is ultrasonically treated under the condition 1 for 1 minute is an indicator indicating the aggregation strength of the aggregates of the primary particles in the h-BN powder. It can be said that the lower the percent decrease is, the higher the aggregation strength of the aggregates is. From the viewpoint of compatibility with a resin or the like when the h-BN powder is added and mixed with the resin or the like, the percent decrease is preferably 5% or more.

The percent decrease is more preferably 5 to 28%, further preferably 10 to 25%.

The classification using the vibrating sieve can be performed using a dry vibrating sieve apparatus, and as the dry vibrating sieve apparatus, "SATO'S SYSTEM VIBRO SEPARATOR" manufactured by KOEI SANGYO CO., LTD. is used.

Here, the ultrasonic treatment time is 1 minute because as described above, aggregates having low aggregation strength among the aggregates all collapse by ultrasonic treatment for 3 minutes, and evaluation at a stage in the process of the collapse of these is performed.

The powder classified within the particle diameter range of more than 45 μm and 106 μm or less is defined as an object to be evaluated in the evaluation of the aggregation strength of the aggregates here and does not define the particle diameter of the h-BN powder of the present invention. In the particle size distribution curve representing volume-based frequency distribution, the range including the maximum peak C is within the particle diameter range of 45.0 to 150.0 μm considering that a peak may be measured outside the above particle diameter range.

For the maximum peak C before treatment and the maximum peak C after treatment, the particle diameters at the peak positions are not necessarily the same. Usually, the peak position shifts to the smaller particle diameter side after treatment compared with before treatment.

The particle size distribution curves are all measured using a particle size distribution meter according to a laser diffraction scattering method, and specifically obtained by measuring using the Microtrac (registered trademark) particle size distribution measuring apparatus as described in the following Examples.

[Method for Producing Hexagonal Boron Nitride (h-BN) Powder]

The h-BN powder of the present invention can be preferably produced, for example, by the production method of the present invention as described below, though the method for producing the same is not particularly limited.

The production method of the present invention is a production method comprising the steps of preparing a mixed powder comprising 50 to 90 parts by mass of a h-BN raw material powder and 10 to 50 parts by mass of one or two or more boron compounds selected from the group consisting of a boron oxoacid and boron oxide; adding and mixing with 100 parts by mass of the mixed powder 3.0 to 10.0 parts by mass, in terms of carbon atoms, of one or two or more carbon sources selected from the group consisting of graphite and a carbon-containing compound, to prepare a forming material; pressure-forming the forming material to make a formed body having a density of 1.40 to 1.70 g/cm$^3$; firing the formed body under a nitrogen gas atmosphere at 1000 to 2200° C. to obtain a fired material; and grinding the fired material and classifying the ground material, characterized in that h-BN raw material powder has a ratio of the average primary particle diameter L to the average thickness d, L/d, in the range of 2.0 to 15.0, a 50% volume cumulative particle diameter $D_{50}$ of 0.20 to 5.00 μm, a BET specific surface area of 5.0 to 30.0 m$^2$/g, and a crystallite diameter of 150 to 400 Å.

In the method for producing a h-BN powder according to the present invention, the predetermined h-BN raw material powder as described above undergoes a mixing step, a forming step, a firing step, a grinding step, and a classification step in order.

The above production method will be described below in the order of steps.

(Mixing Step (1))

The mixing step (1) is the step of preparing a mixed powder comprising 50 to 90 parts by mass of a h-BN raw material powder and 10 to 50 parts by mass of one or two or more boron compounds selected from the group consisting of a boron oxoacid and boron oxide. From the viewpoint of producing the h-BN powder of the present invention in high yield, the amount of the h-BN raw material powder in the mixed powder is preferably 55 to 85 parts by mass, more preferably 60 to 80 parts by mass. From the same viewpoint, the amount of the boron compound in the mixed powder is preferably 15 to 45 parts by mass, more preferably 20 to 40 parts by mass.

The mixed powder may comprise components other than the h-BN raw material powder and the boron compound within a range in which the h-BN powder of the present invention can be obtained by the production method, but the total content of the h-BN raw material powder and the boron compound in the mixed powder is preferably 90% by mass or more, more preferably 95% by mass or more, and further preferably 100% by mass.

<h-BN Raw Material Powder>

As the h-BN raw material powder, from the viewpoint that the produced h-BN powder can provide high thermal conductivity and high withstand voltage properties to a resin or the like, it is preferred to use a fine powder having a ratio of the average primary particle diameter L to the average thickness d, L/d, in the range of 2.0 to 15.0, a 50% volume cumulative particle diameter $D_{50}$ of 0.20 to 5.00 μm, a BET specific surface area of 5.0 to 30.0 $m^2/g$, and a crystallite diameter of 150 to 400 Å.

The h-BN raw material powder preferably has a h-BN purity of 95% by mass or more, more preferably 97% by mass or more, and further preferably 99% by mass or more.

As the h-BN raw material powder that is such a fine powder, commercial products can be used.

The L/d is more preferably in the range of 5.0 to 10.0, further preferably in the range of 5.0 to 8.0. The $D_{50}$ is more preferably 0.25 to 3.00 μm, further preferably 0.30 to 2.00 μm. The BET specific surface area is more preferably 6.0 to 20.0 $m^2/g$, further preferably 7.0 to 10.0 $m^2/g$. The crystallite diameter is more preferably 180 to 350 Å, further preferably 200 to 300 Å.

The average primary particle diameter L, $D_{50}$, and the BET specific surface area are obtained by the same methods as the measurement methods for the h-BN powder described above.

The average thickness d is the number average value of the thicknesses of the primary particles and specifically a value obtained as the average value of the minor axes of any 100 primary particles of h-BN measured as thicknesses in an observation image of the h-BN raw material powder using a scanning electron microscope (SEM).

The crystallite diameter is a value obtained from X-ray diffraction measurement using Scherrer's formula, and specifically obtained by a method described in the following Examples.

<Boron Compound>

Examples of the boron compound to be mixed with the h-BN raw material powder include boron oxoacids such as orthoboric acid ($H_3BO_3$), metaboric acid ($HBO_2$), and tetraboric acid ($H_2B_4O_7$), and boron oxide (boric anhydride: $B_2O_3$). One of these may be used alone, or two or more of these may be used in combination. Among these, boron oxide is preferred from the viewpoint of the ease of mixing with the h-BN raw material powder, easy availability, and the like.

The purity of the boron compound is preferably 90% by mass or more, more preferably 95% by mass or more, and further preferably 100% by mass.

The mixing method in the mixing step (1) is not particularly limited and can be performed using a general mixing machine for obtaining a mixed powder.

(Mixing Step (2))

The mixing step (2) is the step of adding and mixing, with 100 parts by mass of the mixed powder obtained in the mixing step (1), 3.0 to 10.0 parts by mass, in terms of carbon atoms, of one or two or more carbon sources selected from the group consisting of graphite and a carbon-containing compound, to prepare a forming material.

When the amount of the carbon source added is 3.0 parts by mass or more in terms of carbon atoms, the nitridation of the boron compound is promoted, and the crystallinity of aggregates improves due to the grain growth of the primary particles of h-BN, and therefore the aggregates have sufficient aggregation strength. When the amount of the carbon source added is 10.0 parts by mass or less, the carbon source can be inhibited from remaining unreacted in the produced h-BN particles to cause blackening and an increase in withstand voltage.

The amount of the carbon source added is preferably 3.0 to 8.0 parts by mass, more preferably 3.3 to 5.0 parts by mass, in terms of carbon atoms.

<Carbon Source>

Examples of the carbon source to be added and mixed with the mixed powder include carbon-containing compounds such as graphite, carbon black, boron carbide, sugars, melamine, and phenolic resins. One of these may be used alone, or two or more of these may be used in combination. Among these, graphite and boron carbide are preferred from the viewpoint of the aggregation strength of the aggregates, and production cost, and the like.

As the carbon source, boron carbide is preferred, and in this case, the amount of the boron carbide added is preferably 15 to 20 parts by mass, more preferably 15.5 to 19.5 parts by mass, and further preferably 16 to 19 parts by mass per 100 parts by mass of the mixed powder.

The boron carbide used as the carbon source is preferably a powder having a 50% volume cumulative particle diameter $D_{50}$ of 0.1 to 15.0 μm, more preferably 0.5 to 10.0 μm, and further preferably 1.0 to 8.0 μm.

The $D_{50}$ is preferably 0.1 μm or more from the viewpoint of handling as a powder. When the $D_{50}$ is 15 μm or less, the surface area of the boron carbide powder increases, and therefore the reactivity improves, and the aggregates can be densified.

The $D_{50}$ of the boron carbide powder is obtained by the same method as the measurement method for the h-BN powder described above.

The mixing method in the mixing step (2) is not particularly limited and may be either of wet mixing and dry mixing, but wet mixing is preferred from the viewpoint of obtaining a uniform forming material. The wet mixing can be performed using, for example, a general mixing machine such as a Henschel mixer, a ball mill, or a ribbon blender.

The mixing may be performed with a binder added, from the viewpoint of obtaining a uniform forming material. The binder is not particularly limited, and examples thereof include polyvinyl alcohol (PVA), cellulose, and resins such as polyvinylidene fluoride (PVDF). One of these may be used alone, or two or more of these may be used in combination. Among these, PVA is preferably used.

The binder may be added as a solution. For example, when PVA is used, preferably an aqueous solution having a concentration of 0.1 to 15% by mass, more preferably 0.5 to 10% by mass, and further preferably 1 to 5% by mass is added.

The amount of the binder added is preferably within a range in which the aggregation strength of the aggregates in the produced h-BN powder is not decreased. For example, when PVA is used, the amount of the binder added is preferably 0.05 to 2 parts by mass, more preferably 0.1 to 1 part by mass, and further preferably 0.15 to 0.5 parts by mass per 100 parts by mass of the mixed powder.

(Forming Step)

The forming step is the step of pressure-forming the forming material obtained in the mixing step, to make a formed body having a density of 1.40 to 1.70 g/cm$^3$.

By firing the pressure-formed formed body, the aggregates of the primary particles of h-BN can be densified, and the aggregation strength of the aggregates can be increased.

The shape of the formed body is not particularly limited but is preferably, for example, a tablet shape such as a disk shape, from the viewpoint of processability, the ease of handling, and the like.

The formed body is preferably made so as to have a density of 1.40 to 1.70 g/cm$^3$, more preferably 1.45 to 1.68 g/cm$^3$, and further preferably 1.50 to 1.65 g/cm$^3$, from the viewpoint of densifying the aggregates of the primary particles of h-BN and increasing the aggregation strength of the aggregates.

The forming method is not particularly limited but is preferably performed, for example, by uniaxial pressing with the forming material placed in a die, from the viewpoint of making high density formed body.

(Firing Step)

The firing step is the step of firing the formed body under a nitrogen gas atmosphere at 1000 to 2200° C. to obtain a fired material.

The firing is preferably performed in a nitrogen gas atmosphere from the viewpoint of obtaining a high purity h-BN powder in which aggregates of primary particles of h-BN are densified, and no oxygen gas is preferably contained in the firing atmosphere.

The nitrogen gas in the atmosphere preferably has a purity of 90% by volume or more, more preferably 95% by volume or more, and further preferably 100% by volume.

The firing temperature is preferably 1000 to 2200° C., more preferably 1500 to 2200° C., and further preferably 1700 to 2200° C. from the viewpoint of the progress of the reduction-nitridation reaction, the inhibition of the decomposition of h-BN, and the like.

The firing time is preferably 6 to 20 hours, more preferably 8 to 18 hours, and further preferably 10 to 15 hours from the viewpoint of the progress of the reduction-nitridation reaction, the inhibition of the decomposition of h-BN, and the like.

In a case where a binder in the form of an aqueous solution or the like is used in the mixing step, or the like, the formed body may be dried before firing as needed. The drying temperature is preferably 150 to 400° C., more preferably 200 to 400° C. The drying time is preferably 5 to 20 hours, more preferably 8 to 15 hours.

(Grinding and Classification Step)

The grinding and classification step are the steps of grinding the fired material obtained in the firing step, and classifying the ground material.

The grinding method is not particularly limited and can be performed using, for example, a known method using a jaw crusher, a pin mill, a roll crusher, or the like.

The classification method is not particularly limited and can be performed using, for example, means such as a vibrating sieve apparatus, airflow classification, a water sieve, or centrifugation. Among these, classification is preferably performed using a vibrating sieve apparatus. Examples of the vibrating sieve apparatus include dry vibrating sieve apparatuses such as "SATO'S SYSTEM VIBRO SEPARATOR" (manufactured by KOEI SANGYO CO., LTD.). In this case, classification is performed using a sieve having an opening corresponding to the desired particle size.

In order to obtain a h-BN powder having a particle size that achieves the effects of the present invention, the ground material is preferably classified into a particle diameter of 400 μm or less, more preferably a particle diameter of 300 μm or less, and further preferably 200 μm or less.

It is also possible to mix, in amounts in a predetermined proportion, powders classified in respective particle diameter ranges using sieves having two or more openings, to provide the h-BN powder of the present invention. For example, it is possible to obtain a powder having a particle diameter of more than 45 μm and 106 μm or less (1) and a powder having a particle diameter of 45 μm or less (2) using sieves having openings of 45 μm and 106 μm, and mix the powders (1) and (2) in amounts in a predetermined proportion to provide the h-BN powder of the present invention.

[Composition]

The composition of the present invention comprises a base material comprising one or two or more selected from the group consisting of a resin and a rubber, and the h-BN powder.

In the composition, the h-BN powder is blended with the base material as a filler for increasing thermal conductivity and withstand voltage. By using the h-BN powder, the granular shape of the aggregates of the primary particles of h-BN is easily maintained and the filling rate in the base material can be increased when the h-BN powder is added and mixed with the base material.

The h-BN powder is preferably contained in the composition in an amount of 10 to 90% by volume, more preferably 20 to 80% by volume, and further preferably 30 to 70% by volume from the viewpoint of performance as the filler, compatibility with the base material, and the like.

The volume content of the h-BN powder in the composition is calculated by dividing by the density of boron nitride the mass content of the h-BN powder measured by the combustion method described in JIS K 7075: 1991 "Testing methods for carbon fiber content and void content of carbon fiber reinforced plastics". For the total volume of the composition, the value calculated from the specific gravities of boron nitride and the base material is used.

(Base Material)

The base material of the composition of the present invention is selected from the group consisting of a resin and a rubber. Among these, one may be used alone, or two or more may be used in combination.

The content of the base material in the composition is preferably within a range in which the effect of the addition and mixing of the h-BN powder is provided, and is preferably 10 to 90% by volume, more preferably 20 to 80% by volume, and further preferably 30 to 70% by volume.

The volume content of the base material in the composition is obtained from the total volume calculated from the specific gravities of boron nitride and the base material, and the volume content of the h-BN powder.

Examples of the resins include thermosetting resins, thermoplastic resins, thermoplastic elastomers, and oils.

Examples of the thermosetting resins include epoxy resins, silicone resins, phenolic resins, urea resins, unsaturated polyester resins, melamine resins, polyimide resins, polybenzoxazole resins, and urethane resins.

Examples of the thermoplastic resins include polyolefin resins such as polyethylene, polypropylene, and ethylene-vinyl acetate copolymers; polyester resins such as polyethylene terephthalate, polybutylene terephthalate, and liquid crystal polyesters; polyvinyl chloride resins, acrylic resins, polyphenylene sulfide resins, polyphenylene ether resins, polyamide resins, polyamide-imide resins, and polycarbonate resins.

Examples of the thermoplastic elastomers include olefin-based thermoplastic elastomers, styrene-based thermoplastic elastomers, vinyl chloride-based thermoplastic elastomers, urethane-based thermoplastic elastomers, and ester-based thermoplastic elastomers.

Examples of the oils include greases such as silicone oils.

Examples of the rubbers include natural rubbers, polyisoprene rubbers, styrene-butadiene rubbers, polybutadiene rubbers, ethylene-propylene rubbers, ethylene-propylene-diene rubbers, butadiene-acrylonitrile rubbers, isobutylene-isoprene rubbers, chloroprene rubbers, silicone rubbers, fluororubbers, chloro-sulfonated polyethylene, and polyurethane rubbers. These rubbers are preferably crosslinked.

The base material is appropriately selected according to characteristics such as mechanical strength, heat resistance, durability, softness, and flexibility required in the application uses of a heat dissipation material obtained using the composition of the present invention. As the base material, thermosetting resins are preferred. Among these, epoxy resins and silicone resins are preferably used, and epoxy resins are more preferred.

<Epoxy Resin>

As the epoxy resin used for the base material, for example, epoxy resins that are liquid at ordinary temperature (25° C.), and low softening point epoxy resins that are solid at ordinary temperature (25° C.) are preferred, from the viewpoint of the dispersibility of the h-BN powder in the base material.

Such an epoxy resin should be a compound having two or more epoxy groups in one molecule. Examples thereof include bisphenol A type epoxy resins, bisphenol F type epoxy resins, glycidyl ethers of polycarboxylic acids, and epoxy resins obtained by the epoxidation of cyclohexane derivatives. One of these may be used alone, or two or more of these may be used in combination. Among these, bisphenol A type epoxy resins, bisphenol F type epoxy resins, and epoxy resins obtained by the epoxidation of cyclohexane derivatives are preferred from the viewpoint of heat resistance, the ease of handling, and the like.

From the viewpoint of the inhibition of the segregation of the h-BN powder in the base material, the mechanical characteristics, such as toughness, of a heat dissipation material obtained from the composition, and the like, a thermoplastic resin soluble in the epoxy resin is preferably further blended.

As such a thermoplastic resin, a thermoplastic resin having a hydrogen-bonding functional group is preferred. Examples of the functional group include an alcoholic hydroxyl group, an amide bond, a sulfonyl group, and a carboxyl group. Specific examples of the thermoplastic resin include thermoplastic resins having an alcoholic hydroxyl group such as polyvinyl acetal resins such as polyvinyl formal and polyvinyl butyral, polyvinyl alcohol, and phenoxy resins; thermoplastic resins having an amide bond such as polyamides, polyimides, polyamide-imides, and polyvinylpyrrolidone; thermoplastic resins having a sulfonyl group such as polysulfones; and thermoplastic resins having a carboxyl group such as polyesters, polyamides, and polyamide-imides. Among these, thermoplastic resins having an alcoholic hydroxyl group are preferred, and phenoxy resins are more preferred.

The amount of the thermoplastic resin having the hydrogen-bonding functional group blended is preferably 0.05 to 50 parts by mass, more preferably 1.0 to 30 parts by mass, and further preferably 5 to 25 parts by mass per 100 parts by mass of the total of the epoxy resin, and a curing agent and a curing accelerator used as needed.

In order to cure the epoxy resin, a curing agent for the epoxy resin can be used as needed. The curing agent is not particularly limited, and a known one can be appropriately selected and used. Examples of the curing agent include amine-based, phenol-based, acid anhydride-based, and imidazole-based curing agents. One of these may be used alone, or two or more of these may be used in combination.

Examples of the amine-based curing agents include dicyandiamide and aromatic diamines such as m-phenylenediamine, 4,4'-diaminodiphenylmethane, 4,4'-diaminodiphenyl sulfone, and m-xylylenediamine.

Examples of the phenol-based curing agents include phenol novolac resins, cresol novolac resins, bisphenol A type novolac resins, and triazine-modified phenol novolac resins.

Examples of the acid anhydride-based curing agents include alicyclic acid anhydrides such as methylhexahydrophthalic anhydride, aromatic acid anhydrides such as phthalic anhydride, aliphatic acid anhydrides such as aliphatic dibasic acid anhydrides, and halogen-based acid anhydrides such as chlorendic anhydrides.

Examples of the imidazole-based curing agents include 2-methylimidazole, 2-undecylimidazole, 2-heptadecylimidazole, 2-ethyl-4-methylimidazole, 2-phenylimidazole, 2-phenyl-4-methylimidazole, and 1-cyanoethyl-2-ethyl-4-methylimidazole.

The amount of the curing agent used is usually about 0.5 to 1.5 equivalents, preferably 0.7 to 1.3 equivalents, based on the epoxy resin in terms of the balance of curability and cured resin physical properties, and the like.

The epoxy resin can be used in combination with a curing accelerator for the epoxy resin together with the curing agent as needed. The curing accelerator is not particularly limited, and a known one can be appropriately selected and used. Examples of the curing accelerator include imidazole compounds such as 2-ethyl-4-methylimidazole, 1-benzyl-2-methylimidazole, 2-methylimidazole, 2-ethylimidazole, 2-isopropylimidazole, 2-phenylimidazole, and 2-phenyl-4-methylimidazole; 2,4,6-tris(dimethylaminomethyl)phenol; boron trifluoride-amine complexes; and triphenylphosphine. One of these may be used alone, or two or more of these may be used in combination.

The amount of the curing accelerator used is usually about 0.1 to 10 parts by mass, preferably 0.4 to 5 parts by mass, per 100 parts by mass of the epoxy resin in terms of the balance of curability and cured resin physical properties, and the like.

<Silicone Resin>

As the silicone resin, a mixture of an addition reaction type silicone resin and a silicone-based crosslinking agent can be used.

Examples of the addition reaction type silicone resin include polyorganosiloxanes having an alkenyl group as a functional group. Specific examples of the polyorganosiloxanes include polydimethylsiloxane having a vinyl group as a functional group, polydimethylsiloxane having a hexenyl group as a functional group, and mixtures thereof.

Examples of the silicone-based crosslinking agent include polyorganosiloxanes having two or more silicon atom-bonded hydrogen atoms in one molecule. Specific examples include dimethylhydrogensiloxy group end-capped dimethylsiloxane-methylhydrogensiloxane copolymers, trimethylsiloxy group end-capped dimethylsiloxane-methylhydrogensiloxane copolymers, trimethylsiloxane group end-capped poly(methylhydrogensiloxane), and poly(hydrogen silsesquioxane).

Examples of the curing catalyst for obtaining the silicone resin include platinum-based catalysts such as particulate platinum, particulate platinum adsorbed on carbon powder supports, chloroplatinic acid, alcohol-modified chloroplatinic acid, and olefin complexes of chloroplatinic acid; palladium catalysts; and rhodium catalysts. Among these, usually platinum-based catalysts are used.

(Other Components)

The composition may contain other components other than the base material and the h-BN powder within a range in which the effects of the present invention are not impaired, but the total content of the base material and the h-BN powder in the composition is preferably 90% by mass or more, more preferably 95% by mass or more, and further preferably 100% by mass.

Examples of the other components include nitride particles such as aluminum nitride, silicon nitride, and fibrous boron nitride; insulating metal oxides such as alumina, fibrous alumina, zinc oxide, magnesium oxide, beryllium oxide, and titanium oxide; insulating carbon components such as diamond and fullerenes; inorganic fillers such as aluminum hydroxide and magnesium hydroxide; surface-treating agents such as silane coupling agents for improving adhesive strength at the interface between the inorganic filler and the resin, reducing agents, plasticizers, pressure-sensitive adhesives, reinforcing agents, colorants, heat resistance-improving agents, viscosity-adjusting agents, dispersion stabilizers, and solvents.

(Production of Composition)

The composition of the present invention can be produced, for example, as follows when a resin is used as the base material, though the method for producing the same is not particularly limited.

First, as a base material, a resin, and a curing agent, a solvent, and the like added as needed are mixed, and the h-BN powder is added and mixed with the mixture so as to provide the desired volume content, thereby obtaining a composition.

The mixing method is not particularly limited and can be performed using a known method and mixing machine according to the application use of the composition.

[Heat Dissipation Material]

The heat dissipation material of the present invention comprises the composition. The heat dissipation material can exhibit excellent heat dissipation properties and insulation properties because the h-BN powder of the present invention described above is used as a filler.

Examples of the heat dissipation material include heat dissipation materials having various properties such as sheets, gels, greases, adhesives, and phase change sheets, and its shape is not particularly limited either. Among these, for example, heat dissipation sheets efficiently transfer heat produced from electronic components such as microprocessors (MPUs), power transistors, and transformers to heat dissipation components such as heat dissipation fins and heat dissipation fans. The heat dissipation material has excellent heat dissipation properties and insulation properties and therefore can be preferably applied to such uses.

The heat dissipation sheet is obtained by forming the composition into a sheet shape. When the base material of the composition is a curable resin or the like, the heat dissipation sheet is obtained by forming and curing.

The heat dissipation sheet can be formed by coating a releasable film such as a release layer-attached resin film with the composition using a coating machine or the like, and drying the composition using a far-infrared radiation heater, warm air blowing, or the like when the composition comprises a solvent. As the release layer, for example, a melamine resin is used. As the resin film, for example, a polyester resin such as polyethylene terephthalate is used.

When the base material of the composition is not a curable resin or the like, a sheet-shaped formed material is the heat dissipation sheet.

When the base material of the composition is a curable resin or the like, the heat dissipation sheet is obtained by pressurizing and heating the sheet-shaped formed material from the surface of the releasable film opposite to the coated surface via the releasable film according to the curing conditions of the curable resin, and the like to cure the formed material, and then peeling the releasable film.

Other auxiliary members having a sheet shape, a fibrous shape, a mesh shape, or the like can also be laminated or embedded in at least one surface of the heat dissipation sheet and the sheet interior for the purpose of the improvement of workability, reinforcement, and the like. From the viewpoint of convenience during use, and the like, a tacky layer may be provided on at least one surface of the heat dissipation sheet.

EXAMPLES

The present invention will be specifically described below by means of Examples, but the present invention is not limited to the following Examples.

Production of h-BN Powders

Example 1

65 Parts by mass of a h-BN raw material powder (L/d: 6.0, $D_{50}$: 0.67 μm, BET specific surface area 9.9 m$^2$/g, crystallite diameter 262 Å) and 35 parts by mass of boron oxide (manufactured by KANTO CHEMICAL CO., INC.) were mixed using a mixer to obtain a mixed powder.

18 Parts by mass (3.9 parts by mass in terms of carbon atoms) of boron carbide (manufactured by RIKEN CORUNDUM CO., LTD., $D_{50}$: 3 μm) and 10 parts by mass of a PVA aqueous solution (concentration 2.5% by mass) were added to 100 parts by mass of the mixed powder and mixed using the mixer to obtain a forming material.

The forming material was placed in a die and pressurized to obtain a tablet-shaped formed body having a density of 1.6 g/cm$^3$.

The formed body was dried using a dryer at 300° C. for 6 hours and then fired in a high frequency furnace under a nitrogen gas atmosphere at 1750 to 2200° C. for 12 hours to obtain a fired material.

The fired material was ground by a jaw crusher and a pin mill and then classified by 60-minute treatment using a dry vibrating sieve apparatus ("SATO'S SYSTEM VIBRO SEPARATOR", manufactured by KOEI SANGYO CO., LTD.) with sieves having openings of 106 μm and 45 μm stacked.

The powder of more than 106 μm was removed, and the powder having a particle diameter of more than 45 μm and 106 μm or less (1) and the powder passing through the 45 μm sieve (particle diameter 45 μm or less) (2) that were classified were mixed to obtain a h-BN powder. The powder (1) and the powder (2) were mixed so that the amount of the powder (1) was 80% by mass in 100% by mass of the total of the powders (1) and (2).

Examples 2 and 3, and Comparative Examples 1 to 3 h-BN powders were produced as in Example 1 except that in Example 1, the blending composition of the h-BN raw material powder, boron oxide, and boron carbide, and the like, and the mixing proportion of the powder (1) and the powder (2) were changed as shown in the following Table 1.

Production of Heat Dissipation Sheets

Compositions were made as follows using the h-BN powders produced in the above Examples and Comparative Examples, and further, heat dissipation sheets were produced using the compositions.

A mixture of 90 parts by mass of a bisphenol A type epoxy resin that was liquid at room temperature (25° C.) ("YD-128", manufactured by NIPPON STEEL & SUMIKIN CHEMICAL CO., LTD., epoxy equivalent 184 to 194 g/eq) and 10 parts by mass of a phenoxy resin ("YP-50S", manufactured by NIPPON STEEL & SUMIKIN CHEMICAL CO., LTD., purity 99.0% by mass or more) was used as a base material. A h-BN powder was added and mixed with the base material so that the content of the h-BN powder in the composition was 60% by volume. 153 Parts by mass of methoxypropanol ("Hisolve MP", manufactured by TOHO CHEMICAL INDUSTRY Co., Ltd.) (170 parts by mass per 100 parts by mass of the bisphenol A type epoxy resin) as a viscosity-adjusting agent was added, and the mixture was stirred and mixed using a stirring-defoaming apparatus ("MAZERUSTAR (registered trademark)", manufactured by KURABO INDUSTRIES LTD.) to make the composition. The volume content of the h-BN powder was obtained from the specific gravity of h-BN, 2.27 g/cm$^3$, and the specific gravity of the bisphenol A type epoxy resin, 1.17 g/cm$^3$.

A releasable film made of polyethylene terephthalate was coated with the composition with a film thickness of 350 μm using a coater and dried at 50° C. in the air for 10 minutes and further under vacuum for 10 minutes to obtain a sheet-shaped formed material.

Two of the sheet-shaped formed materials were superimposed so that the formed materials were in contact with each other, and then roll-pressurized to set the total thickness of the formed materials at 200 μm. Then, the formed materials were hot-pressed at 120° C. for 30 minutes for curing to produce a heat dissipation sheet 10 cm long, 10 cm wide, and 300 μm thick.

[Various Evaluations]

Various evaluations for the above Examples and Comparative Examples were performed as follows.

(50% Volume Cumulative Particle Diameters $D_{50}$ of h-BN Raw Material Powder, Boron Carbide, and h-BN Powder)

A dispersion comprising 0.06 g of a powder sample, 50 g of water (20° C.), and 0.005 g of a detergent ("Mama Lemon", manufactured by Lion Corporation) as a dispersing agent and having a powder sample concentration of 0.12% by mass was prepared. While the dispersion was stirred at 400 rpm using a magnetic stirrer, the particle size distribution was measured using a particle size distribution measuring apparatus ("Microtrac (registered trademark) MT3300EXII", manufactured by NIKKISO CO., LTD.) according to a laser diffraction scattering method to obtain $D_{50}$.

(Average Primary Particle Diameters of h-BN Raw Material Powder and h-BN Powder, and L/d of h-BN Raw Material Powder)

An SEM photograph of a powder sample was taken, the major axes of any 100 primary particles of h-BN in the photograph image were measured, and the average value of these was taken as the average primary particle diameter.

The minor axes of any 100 primary particles of h-BN in the photograph image were measured as thicknesses, and the average value of these was d. L/d was calculated with the average primary particle diameter of the h-BN raw material powder obtained above being L.

(BET Specific Surface Areas of h-BN Raw Material Powder and h-BN Powder)

For a powder sample, the specific surface area was measured using a fully automatic BET specific surface area measuring apparatus ("Multisorb 16", manufactured by YUASA IONICS) by a BET one-point method according to a flow method (adsorbate: nitrogen gas).

(Bulk Density of h-BN Powder)

The density calculated from the volume after 100 g of a powder sample was introduced into a 300 mL graduated cylinder and horizontally vibrated using an electric vibrating machine (number of vibrations 50 Hz, output 0.035 kW) for 3 minutes was taken as the bulk density.

(Crystallite Diameter of h-BN Raw Material Powder)

For a powder sample, X-ray diffraction measurement was performed using an X-ray diffraction measuring apparatus ("X'Pert PRO", manufactured by PANalytical, target: copper, Cu-Kα1 rays), and the crystallite diameter D [Å] was calculated from Scherrer's formula represented by the following formula (1):

$$D=(K\cdot\lambda)/(\beta\cdot\cos\theta) \quad (1)$$

wherein K: the Scherrer constant, λ: the X-ray (Cu-Kα1 ray) wavelength [Å], β: the breadth of the diffraction line (peak half-width) [radians], and θ: the Bragg angle [radians].

In the calculation, K=0.9 and λ=1.54059 [Å] were set. For β, the value obtained by the correction formula represented by the following formula (2) was used.

$$\beta=(\beta_o^2-\beta_i^2)^{0.5} \quad (2)$$

wherein $\beta_o$: the peak half-width derived from the h-BN (002) plane, and $\beta_i$: the half-width derived from the apparatus with a standard sample (Si).

(Density of Formed Body)

For a formed body, the mass was measured using a mass meter, and the volume was measured by the Archimedes method, and the density was calculated from the measured values of the mass and the volume.

(a1/b1 and a2/b2 of h-BN Powder)

As in the above case where $D_{50}$ was obtained, a dispersion of a h-BN powder was prepared, and the particle size distribution was measured to obtain the particle size distribution curve. In the particle size distribution curve, the ratio of the height a1 of a peak A in the particle diameter range of 1.0 μm or more and less than 20.0 μm to the height b1 of a peak B in the particle diameter range of 20.0 μm or more and less than 200.0 μm, a1ib1, was obtained.

A dispersion of a h-BN powder prepared in the same manner as the dispersion was placed in a 50 mL glass beaker having a barrel inner diameter (I) of 40 mm and a height (H) of 60 mm, and ultrasonically treated using an ultrasonic generator ("Ultrasonic Homogenizer US-150T", manufactured by NIHONSEIKI KAISHA LTD., output 150 W, oscillation frequency 19.5 kHz) for 3 minutes. The ultrasonic treatment was performed by setting the end of the tip (made of stainless steel, a cylindrical shape having a diameter (x) of 18 mm) 13 of the vibrator of the ultrasonic generator at a height (y) of 1 cm from the bottom surface of the central portion of the beaker as shown in FIG. 2.

For the dispersion after the ultrasonic treatment, the particle size distribution was measured in the same manner as above to obtain the particle size distribution curve. In the particle size distribution curve, the ratio of the height a2 of a peak A in the particle diameter range of 1.0 μm or more and less than 20.0 μm to the height b2 of a peak B in the particle diameter range of 20.0 μm or more and less than 200.0 μm, a2/b2, was obtained.

Figure 5:
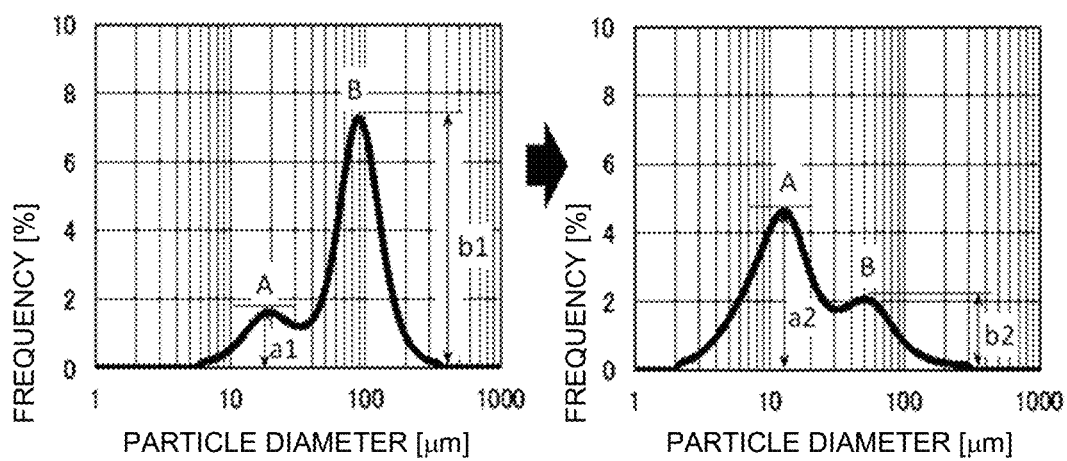
FIG. 5 shows particle size distribution curves of the h-BN powder of Comparative Example 3 when it is ultrasonically treated for 3 minutes. The particle size distribution curve before the ultrasonic treatment is on the left side, and the particle size distribution curve after the ultrasonic treatment is on the right side.

As typical examples of particle size distribution curves for the h-BN powders of the Examples and the Comparative Examples, particle size distribution curves for Example 2 are shown in FIG. 2, and particle size distribution curves for Comparative Example 3 are shown in FIG. 5. The particle size distribution curve before the ultrasonic treatment is on the left side of each figure, and the particle size distribution curve after the ultrasonic treatment is on the right side.

(((c1−c2)/c1×100) of h-BN Powder)

A h-BN powder was classified by treatment using a dry vibrating sieve apparatus ("SATO'S SYSTEM VIBRO SEPARATOR", manufactured by KOEI SANGYO CO., LTD.) for 60 minutes using sieves having openings of 106 μm and 45 μm stacked, to obtain a powder sample classified within the particle diameter range of more than 45 μm and 106 μm or less.

For the powder sample, as in the above case where a1ib1 was obtained, a dispersion of the powder sample was prepared, and the particle size distribution was measured to obtain the particle size distribution curve. In the particle size distribution curve, the height c1 of the maximum peak C within the particle diameter range of 45.0 to 150.0 μm was obtained.

A dispersion of the powder sample prepared in the same manner as the dispersion was ultrasonically treated using an ultrasonic generator ("Ultrasonic Homogenizer US-150T", manufactured by NIHONSEIKI KAISHA LTD., output 150 W, oscillation frequency 19.5 kHz) for 1 minute. For the dispersion after the treatment, the particle size distribution was measured in the same manner as above to obtain the particle size distribution curve. In the particle size distribution curve, the height c2 of the maximum peak C after the ultrasonic treatment within the particle diameter range of 45.0 to 150.0 μm was obtained.

From the c1 and c2, the percent decrease in the height of the maximum peak C, ((c1−c2)/c1×100) [%], was calculated.

(Thermal Conductivity of Heat Dissipation Sheet)

The thermal diffusivity [m$^2$/s] of a heat dissipation sheet was measured using a xenon flash analyzer ("LFA447 NanoFlash", manufactured by NETZSCH). The value obtained by multiplying the measured value by the specific heat and density of the heat dissipation sheet was taken as the thermal conductivity [W/(m·K)] of the heat dissipation sheet in the thickness direction. The calculation was performed using theoretical values (room temperature (25° C.)), h-BN: 0.8 J/(g·K) and the resin component (derived from the base material): 1.8 J/(g·K), for the specific heat and theoretical values (room temperature (25° C.)), h-BN: 2.27 g/cm$^3$ and the resin component (derived from the base material): 1.17 g/cm$^3$, for the density.

A thermal conductivity of 15 W/(m·K) or more was determined as excellent heat dissipation properties.

(Withstand Voltage of Heat dissipation Sheet)

The withstand voltage (breakdown voltage) [kV/mm] of a heat dissipation sheet was measured at a voltage rise rate of 0.1 kV/sec using a withstand voltage/insulation resistance measuring apparatus ("TOS9201/5101", manufactured by KIKUSUI ELECTRONICS CORPORATION).

A withstand voltage of 10 kV/mm or more was determined as excellent insulation properties.

The details of the blended raw materials of the h-BN powders of the Examples and the Comparative Examples are shown in the following Table 1. The evaluation results for the h-BN powders and the heat dissipation sheets are shown in Table 2.

TABLE 1

|  | Examples | | | Comparative Examples | | |
| --- | --- | --- | --- | --- | --- | --- |
|  | 1 | 2 | 3 | 1 | 2 | 3 |
| h-BN raw material powder [parts by mass] | 65 | 65 | 65 | 65 | 65 | 65 |
| Boron oxide [parts by mass] | 35 | 35 | 35 | 35 | 35 | 35 |
| Boron carbide [parts by mass] (in terms of carbon atoms [parts by mass]) | 18 (3.9) | 16 (3.5) | 16 (3.5) | 13 (2.8) | 18 (3.9) | 0 (0) |
| $D_{50}$ [μm] | 3 | 3 | 3 | 24 | 3 | — |
| Powder (1) [% by mass] | 80 | 80 | 70 | 60 | 95 | 80 |
| Powder (2) [% by mass] | 20 | 20 | 30 | 40 | 5 | 20 |

TABLE 2

|  | Examples | | | Comparative Examples | | |
| --- | --- | --- | --- | --- | --- | --- |
|  | 1 | 2 | 3 | 1 | 2 | 3 |
| h-BN powder | | | | | | |
| Average primary particle diameter [μm] | 3.5 | 3.2 | 3.3 | 3.8 | 3.7 | 6.8 |
| $D_{50}$ [μm] | 83.7 | 85.5 | 80.2 | 29.8 | 87.8 | 75.4 |
| BET specific surface area [m²/g] | 4.2 | 4.2 | 4.3 | 4.0 | 4.1 | 6.1 |
| Bulk density [g/cm³] | 0.84 | 0.86 | 0.86 | 0.65 | 0.82 | 0.62 |
| Peak A (before treatment) [μm] | 8.5 | 7.8 | 9.3 | 8.5 | 13.1 | 18.5 |
| a1 | 0.77 | 0.84 | 1.02 | 2.57 | 0.49 | 1.63 |
| Peak B (before treatment) [μm] | 96.0 | 104.7 | 104.7 | 88.0 | 96.0 | 88.0 |
| b1 | 7.63 | 7.17 | 7.46 | 3.13 | 8.38 | 7.27 |
| a1/b1 | 0.10 | 0.12 | 0.14 | 0.82 | 0.06 | 0.22 |
| Peak A (after treatment) [μm] | 3.6 | 3.9 | 3.9 | 4.2 | 3.3 | 13.1 |
| a2 | 2.89 | 3.04 | 3.33 | 3.56 | 1.91 | 4.62 |
| Peak B (after treatment) [μm] | 74.0 | 67.9 | 80.7 | 57.1 | 80.7 | 52.3 |
| b2 | 4.05 | 3.09 | 2.87 | 1.85 | 6.35 | 2.08 |
| a2/b2 | 0.71 | 0.98 | 1.16 | 1.92 | 0.30 | 2.22 |
| Maximum peak C (before treatment) [μm] | 96.0 | 96.0 | 104.7 | 96.0 | 96.0 | 104.7 |
| c1 | 9.56 | 10.05 | 10.27 | 10.17 | 9.89 | 10.29 |
| Maximum peak C (after treatment) [μm] | 88.0 | 80.7 | 88.0 | 80.7 | 88.0 | 74.0 |
| c2 | 7.86 | 7.79 | 8.12 | 7.07 | 7.69 | 5.65 |
| (c1 − c2)/c1 × 100 [%] | 18 | 22 | 21 | 30 | 22 | 45 |
| Heat dissipation sheet | | | | | | |
| Thermal conductivity [W/(m · K)] | 18.5 | 18.0 | 17.6 | 13.6 | 20.3 | 13.1 |
| Withstand voltage [kV/mm] | 10 | 10 | 12 | 13 | 7 | 9 |

As seen from the evaluation results shown in Table 2, when the alibi of the h-BN powder was large, that is, the amount of fine grains (peak A) was too large compared with the amount of coarse grains (peak B) (Comparative Example 1), the heat dissipation sheet produced using the h-BN powder had low thermal conductivity. The same applies to the case where the a2/b2 of the h-BN powder was small, that is, the amount of fine grains (peak A) was too large compared with the amount of coarse grains (peak B) after the ultrasonic treatment (Comparative Example 3).

When the a1/b1 and a2/b2 of the h-BN powder were both too small (Comparative Example 2), the heat dissipation sheet produced using the h-BN powder had low withstand voltage.

In contrast to these, it was noted that when the a1/b1 and a2/b2 of the h-BN powder were within the predetermined ranges (Examples 1 to 3), the heat dissipation sheet produced using the h-BN powder had both high thermal conductivity and high withstand voltage. This is considered to be because the aggregates of the primary particles of h-BN in the h-BN powder have moderate aggregation strength.

REFERENCE SIGNS LIST 1 an aggregate
2 a primary particle of hexagonal boron nitride (h-BN)
11 a 50 mL glass beaker
12 an aqueous dispersion
13 the tip of the vibrator of an ultrasonic generator

The invention claimed is:

1. A hexagonal boron nitride powder comprising an aggregate of primary particles of hexagonal boron nitride, having an average primary particle diameter of 0.5 μm or more and less than 10.0 μm, a 50% volume cumulative particle diameter $D_{50}$ of 10.0 to 150.0 μm, a BET specific surface area of 1.0 m²/g or more and less than 10.0 m²/g, and a bulk density of 0.50 to 2.00 g/cm³, and having a peak A in a particle diameter range of 1.0 μm or more and less than 20.0 μm and a peak B in a particle diameter range of 20.0 μm or more and less than 200.0 μm in a particle size distribution curve representing volume-based frequency distribution, having a maximum peak C within a particle diameter range of 45.0 to 150.0 μm in a particle size distribution curve representing volume-based frequency distribution of a powder obtained by classifying the hexagonal boron nitride powder within a particle diameter range of more than 45 μm and 106 μm or less using a vibrating sieve, where c1 is a height of the maximum peak C, a ratio of a height a1 of the peak A to a height b1 of the peak B, a1/b1, is in a range of 0.07 to 0.80, wherein, after subjecting the hexagonal boron nitride powder to an ultrasonic treatment under the following condition 1 for 3 minutes,

[condition 1] 50 mL of an aqueous dispersion of 0.12% by mass of the hexagonal boron nitride powder at 20° C. is placed in a 50 mL glass beaker having a barrel inner diameter of 40 mm and a height of 60 mm, an end of a tip of a vibrator of an ultrasonic generator is set at a height of 1 cm from a bottom surface of a central portion of the beaker, and ultrasonic treatment is performed at an output of 150 W and an oscillation frequency of 19.5 kHz, the ultrasonically treated hexagonal boron nitride powder has a ratio of a height a2 of a peak A to a height b2 of a peak B, a2/b2, in a range of 0.40 to 2.00, and a height c2 of a maximum peak C, and wherein a percent decrease in the height of the maximum peak C, (c1−c2)/c1×100, is 5% or more and less than 30%.

2. A method for producing the hexagonal boron nitride powder according to claim 1, comprising steps of:

preparing a mixed powder comprising 50 to 90 parts by mass of a hexagonal boron nitride raw material powder and 10 to 50 parts by mass of one or two or more boron compounds selected from the group consisting of a boron oxoacid and boron oxide;

adding and mixing with 100 parts by mass of the mixed powder 3.0 to 10.0 parts by mass, in terms of carbon atoms, of one or two or more carbon sources selected from the group consisting of graphite and a carbon-containing compound, to prepare a forming material;

pressure-forming the forming material to make a formed body having a density of 1.40 to 1.70 g/cm$^3$;

firing the formed body under a nitrogen gas atmosphere at 1000 to 2200° C. to obtain a fired material; and grinding the fired material and classifying a ground material, wherein the hexagonal boron nitride raw material powder has a ratio of an average primary particle diameter L to an average thickness d, L/d, in a range of 2.0 to 15.0, a 50% volume cumulative particle diameter $D_{50}$ of 0.20 to 5.00 μm, a BET specific surface area of 5.0 to 30.0 m$^2$/g, and a crystallite diameter of 150 to 400 Å.

3. The method for producing the hexagonal boron nitride powder according to claim 2, wherein in the step of preparing a forming material, the carbon source is boron carbide, and 15 to 20 parts by mass of the boron carbide is added and mixed with 100 parts by mass of the mixed powder.

4. The method for producing the hexagonal boron nitride powder according to claim 3, wherein the boron carbide is a powder having a 50% volume cumulative particle diameter $D_{50}$ of 0.1 to 15.0 μm.

5. A composition comprising a base material comprising one or two or more selected from the group consisting of a resin and a rubber, and the hexagonal boron nitride powder according to claim 1.

6. A heat dissipation material comprising the composition according to claim 5.

7. The heat dissipation material according to claim 6, being a heat dissipation sheet.

* * * * *